United States Patent
Xu et al.

(10) Patent No.: US 11,579,597 B2
(45) Date of Patent: Feb. 14, 2023

(54) PEER-LEVEL CONTROL OF INDUSTRIAL AUTOMATION SYSTEM COMPONENTS

(71) Applicant: Rockwell Automation Technologies, Inc., Mayfield Heights, OH (US)

(72) Inventors: Dayin Xu, Shanghai (CN); John P. Caspers, Racine, WI (US); William H. Martin, Franklin, WI (US); Jeffrey S. Martin, Waukesha, WI (US); Jes Asmussen, Whitefish Bay, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/339,396

(22) Filed: Jun. 4, 2021

(65) Prior Publication Data
US 2021/0294305 A1    Sep. 23, 2021

Related U.S. Application Data

(63) Continuation of application No. 16/580,995, filed on Sep. 24, 2019, now Pat. No. 11,036,209.

(51) Int. Cl.
*H04L 12/00* (2006.01)
*G05B 19/418* (2006.01)
(Continued)

(52) U.S. Cl.
CPC ..... *G05B 19/4185* (2013.01); *G05B 19/4083* (2013.01); *H04L 41/0823* (2013.01); *H04L 67/104* (2013.01); *G05B 2219/1137* (2013.01)

(58) Field of Classification Search
CPC ..... H04L 67/12; H04L 41/0823; H04L 67/34; H04L 67/1063; H04L 41/0856;
(Continued)

(56) References Cited

U.S. PATENT DOCUMENTS 6,535,983 B1 * 3/2003 McCormack ........... H04L 12/10
370/410
6,640,308 B1 * 10/2003 Keyghobad .......... G05B 19/042
370/257
(Continued)

FOREIGN PATENT DOCUMENTS

| CN | 108494716 A | * | 9/2018 | ......... G05B 19/4185 |
|---|---|---|---|---|
| KR | 20100034395 A | | 4/2010 | |
| WO | 2018018820 A1 | | 2/2018 | |

OTHER PUBLICATIONS

Allen Bradley; "ControlLogix Peer-to-Peer I/O;" May 2012; 2 pages.
(Continued)

*Primary Examiner* — Frantz Coby
(74) *Attorney, Agent, or Firm* — Fletcher Yoder, P.C.

(57) ABSTRACT

Embodiments of this present disclosure may include a system that includes a first network device. The first network device may perform an operation according to a device configuration file. The system may also include a second network device that directly communicatively couples to the first network device through a peer-to-peer (P-P) communication network. The second network device may include a backup file of the device configuration file. The second network device may transmit the backup file of the device configuration file to the first network device in response to detecting that the first network device is lacking the device configuration file.

20 Claims, 9 Drawing Sheets

(51) Int. Cl.
*G05B 19/408* (2006.01)
*H04L 41/0823* (2022.01)
*H04L 67/104* (2022.01)

(58) Field of Classification Search
CPC ... H04L 43/10; H04L 67/104; H04L 41/0843; G05B 19/4185; G05B 2219/1137; G05B 19/4083
USPC ........................................ 709/224, 223, 225
See application file for complete search history.

(56) References Cited

U.S. PATENT DOCUMENTS

| | | | |
|---|---|---|---|
| 7,082,485 B2 | 7/2006 | Ellerbrock et al. | |
| 7,492,059 B2* | 2/2009 | Peker | H04L 49/351 |
| | | | 307/71 |
| 7,558,846 B2 | 7/2009 | Gu et al. | |
| 7,660,889 B2 | 2/2010 | Gotesdyner et al. | |
| 7,672,591 B2* | 3/2010 | Soto | H04M 19/08 |
| | | | 398/71 |
| 7,940,787 B2* | 5/2011 | Karam | H04L 12/10 |
| | | | 370/463 |
| 7,949,721 B2 | 5/2011 | Burrow et al. | |
| 8,359,397 B2 | 1/2013 | Traversat et al. | |
| 8,582,469 B2 | 11/2013 | Rosenberg | |
| 8,931,101 B2 | 1/2015 | Baluda et al. | |
| 9,037,673 B2 | 5/2015 | Horr et al. | |
| 9,141,792 B2 | 9/2015 | Baluda et al. | |
| 9,143,944 B2 | 9/2015 | Gong et al. | |
| 9,294,562 B2 | 3/2016 | Gong | |
| 9,634,844 B2* | 4/2017 | Paul | G06F 1/26 |
| 9,696,704 B2 | 7/2017 | Xu et al. | |
| 10,659,240 B2* | 5/2020 | Boemi | H01R 13/52 |
| 11,036,209 B2* | 6/2021 | Xu | H04L 41/0856 |
| 11,183,838 B2* | 11/2021 | Fu | H02H 3/22 |
| 2004/0171296 A1* | 9/2004 | Chen | H01R 31/06 |
| | | | 439/502 |
| 2005/0007964 A1 | 1/2005 | Falco et al. | |
| 2006/0047778 A1 | 3/2006 | Adams et al. | |
| 2006/0127034 A1* | 6/2006 | Brooking | H04N 21/41265 |
| | | | 386/362 |
| 2006/0224748 A1 | 10/2006 | Gupta et al. | |
| 2009/0254639 A1 | 10/2009 | Manchester et al. | |
| 2010/0064024 A1 | 3/2010 | Horr | |
| 2010/0153771 A1 | 6/2010 | Gordon et al. | |
| 2014/0137246 A1 | 5/2014 | Baluda et al. | |
| 2014/0325194 A1 | 10/2014 | Brindle | |
| 2016/0050116 A1 | 2/2016 | Sheshadri et al. | |
| 2017/0078382 A1 | 3/2017 | Prakash et al. | |
| 2019/0250910 A1 | 8/2019 | Yu | |
| 2019/0342296 A1 | 11/2019 | Anandam et al. | |
| 2019/0342328 A1 | 11/2019 | Rivner | |

OTHER PUBLICATIONS

Cisco, "Networking and Security in Industrial Automation Environments Design and Implementation Guide;" https://www.cisco.com/c/en/us/td/docs/solutions/Verticals/Industrial_Automation/IA_Horizontal/DG/Industrial-AutomationDG/Industrial-AutomationDG.html; Mar. 13, 2019, 106 pages.

* cited by examiner

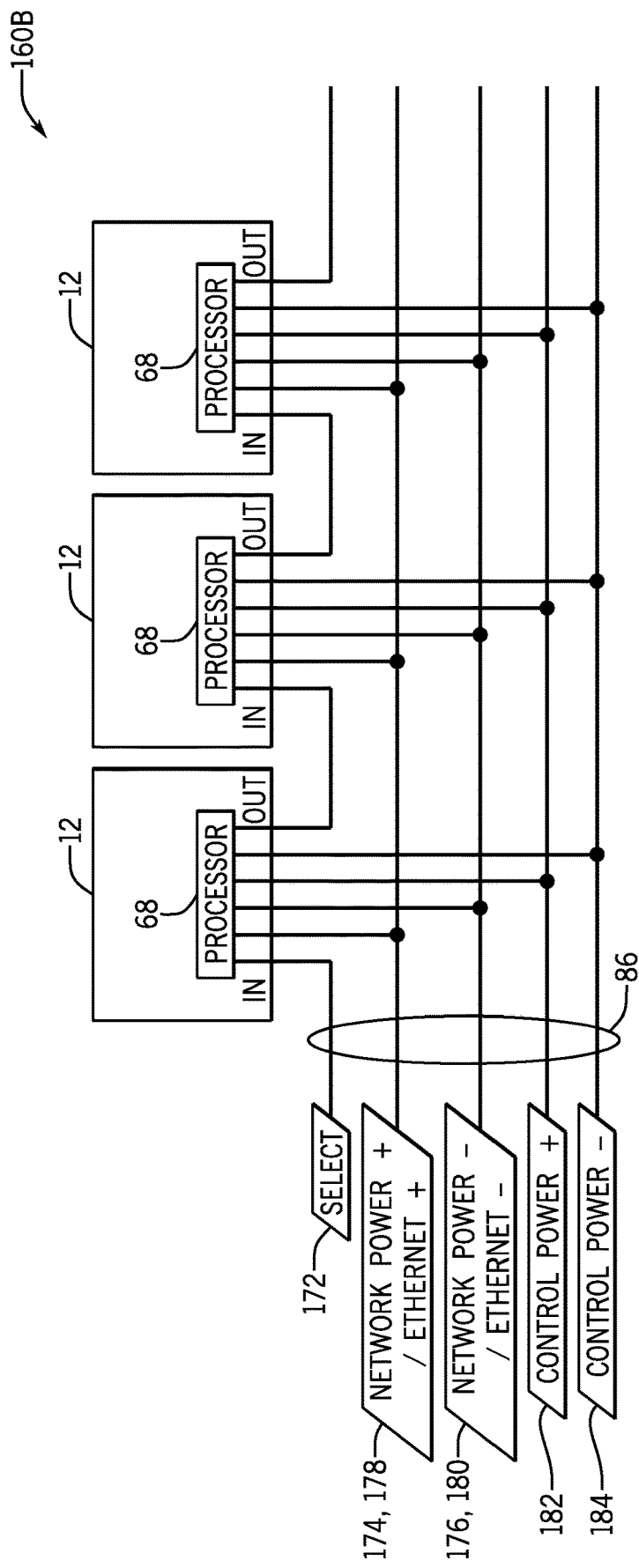

PEER-LEVEL CONTROL OF INDUSTRIAL AUTOMATION SYSTEM COMPONENTS

CROSS-REFERENCE TO RELATED APPLICATIONS

This application is a continuation of U.S. patent application Ser. No. 16/580,995, entitled "PEER-LEVEL CONTROL OF INDUSTRIAL AUTOMATION SYSTEM COMPONENTS," filed Sep. 24, 2019, which is incorporated by reference herein in its entirety for all purposes.

BACKGROUND

This disclosure relates generally to systems and methods for providing a control and monitoring system within an industrial automation system. More particularly, embodiments of the present disclosure are directed toward systems to provide a self-healing, peer-to-peer communication network within the industrial automation system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include automation control and monitoring systems. The automation control and monitoring systems may monitor statuses and/or receive information from a wide range of devices, such as valves, electric motors, a wide range of sensors, other suitable monitoring devices, or the like. One or more components of the automation control and monitoring systems, such as programming terminals, automation controllers, input/output (I/O) modules, communication networks, human-machine interface (HMI) terminals, and the like, may use the statuses and/or received information to provide alerts to operators to change or adjust operation of one or more components of the industrial automation system (e.g., such as adjusting operation of one or more actuators), to manage the industrial automation system, or the like.

The components described above may operate in coordination with a control system. An example of a control system may be a programmable logic controller (PLC) or a programmable logic device (PLD). The control system may receive the statuses and/or information from the wide range of devices, and use the statuses and/or information to make control decisions. An example of a control decision is determining whether to slow or halt operation of a motor or load. The components described above and/or the control system may operate according to stored device configurations. A device configuration may include processing instructions, settings, operating ranges, indications of connections to other components within the industrial automation system, or the like, and may be used to customize an operation of the components and/or the control system to a particular process. When components and/or the control system are replaced, the device configuration may be lost and may be reinstalled for the replacement component and/or control system. The replacement process may be a lengthy process that introduces opportunities for operator error. Furthermore, in some cases, a configuration manager software may be used to replace the configuration of the component and/or control system, thereby increasing time and processing resources used to prepare the replacement component and/or control system for use.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system may include a first network device that performs an operation according to a device configuration file. The system may also include a second network device that directly communicatively couples to the first network device through a peer-to-peer (P-P) communication network. The second network device may include a backup file of the device configuration file. The second network device may transmit the backup file of the device configuration file to the first network device in response to detecting that the first network device is lacking the device configuration file.

In another embodiment, a method may include detecting, via a first network device, that a second network device is lacking a device configuration file. The first network device and the second network device may couple to each other through a peer-to-peer network for an industrial automation system. The method may also include transmitting, via the first network device, a backup configuration file that corresponds to the device configuration file to the second network device in response to detecting that the second network device is lacking the device configuration file. The second network device may perform an operation within the industrial automation system in response to a setting defined by the backup configuration file.

In yet another embodiment, a tangible, non-transitory computer-readable medium may store instructions executable by a processor of an electronic device that, when executed by the processor, cause the processor to discover multiple data endpoints. Each data endpoint of the plurality of data endpoints may correspond to a respective network device coupled to a P-P communication network. The instructions may also cause the processor to generate a device configuration file for a first network device of the P-P communication network based on respective data endpoints of the data endpoints associated with the first network device. The instructions may also cause the processor to transmit the device configuration file to the first network device. The first network device may perform an operation based on the device configuration file. The instructions may also cause the processor to transmit the device configuration file to a second network device of the P-P communication network. The second network device may transmit the device configuration file to the first network device as a backup configuration file in response to detecting that the first network device is lacking the device configuration file.

DRAWINGS

These and other features, aspects, and advantages of the present disclosure will become better understood when the following detailed description is read with reference to the accompanying drawings in which like characters represent like parts throughout the drawings, wherein:

FIG. 10A is a block diagram of logical couplings of the peer-to-peer communication network of FIG. 4 in another example smart wire configuration, in accordance with an embodiment.

DETAILED DESCRIPTION

Figure 1:
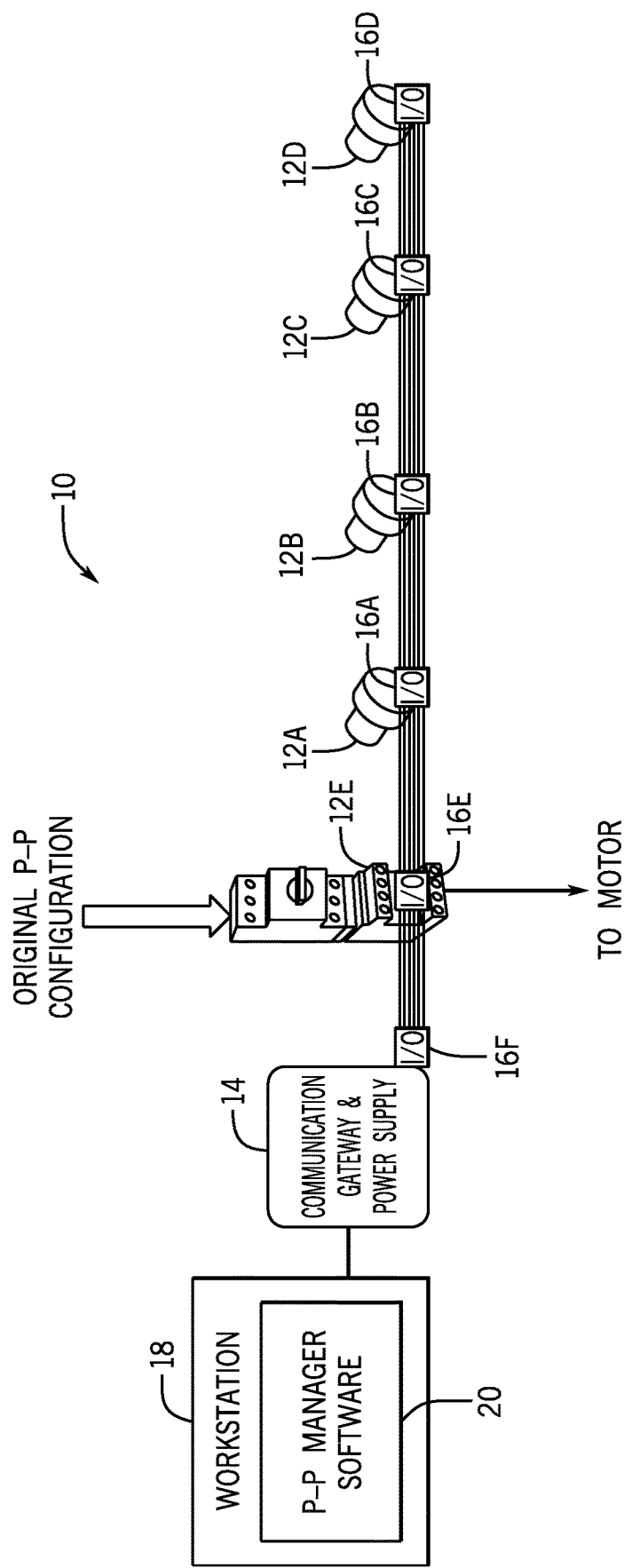
FIG. 1 is a perspective view of an example industrial automation system, in accordance with an embodiment.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards systems and methods that may be useful to improve the replacement process associated with the components and/or the control system of the industrial automation system. In particular, methods described herein may use peer-level control to provide a self-healing, peer-to-peer communication network within an industrial automation system to manage the storage of and access to backup device configuration files after a network device loses a device configuration file or is replaced with a device with an incomplete device configuration file.

As mentioned above, industrial automation systems may include automation control and monitoring systems (e.g., industrial control systems). The automation control and monitoring systems may monitor statuses and/or receive information from a wide range of devices, such as valves, electric motors, sensors, other suitable monitoring devices, or the like. These components may communicate with each other via a suitable network, such as a peer-to-peer communication network. Devices coupled via a peer-to-peer communication network may be configured according to a device configuration file. The device configuration file may include processing instructions, settings, operating ranges, indications of connections to other components within the industrial automation system, or the like, and may be used to customize an operation of devices and/or the control system to a particular process. However, when a device is operating offline or is removed (e.g., as part of a replacement) from the peer-to-peer communication network, the device configuration file may be lost or removed from the device and/or may not be transferred automatically to a replacement device.

In some cases, a configuration manager software may replace the configuration of the device and/or control system, thereby increasing time and processing resources used to prepare the replacement device and/or control system for use. Furthermore, an intermediary control system, such as a programmable logic controller (PLC) or a programmable logic device (PLD), may control communications between components in the peer-to-peer communication network, including communications between the configuration manager software and the network devices. In some cases, the components may manage communications without an intermediary control system by enabling the network devices to directly communicate with each other. Communication networks that include components configurable to communicate without the intermediary control system may be relatively more resilient to unpredicted or unexpected loss of the control system (e.g., control system unexpectedly going offline) than those with the intermediary control system since the communication network may continue to operate even when the intermediary control system is unusable.

To improve replacement and/or maintenance operations of the peer-to-peer network, network devices may store backup device configuration files associated with operation of the peer-to-peer communication network. When a device configuration file is lost or removed from a network device of the peer-to-peer network, a peer network device may transmit a backup device configuration file to replace the lost or removed device configuration file. For example, a first device may store a first device configuration file defining settings, operations, thresholds, or the like for the first device while simultaneously storing a second device configuration file that defines settings, operations, thresholds, or the like for a second device. If the second device configuration file (e.g., original device configuration file) stored in the second device was lost, the first device may transmit the second backup device configuration file (e.g., backup of the original device configuration file) to the second device for configuration. The redundancy and sharing operations of the device configuration files between the devices may occur independent of an intermediary control system. Redundant device configuration file storage may further improve a resiliency of the peer-to-peer communication network to unpredicted or unexpected loss of the intermediary control system (e.g., control system unexpectedly going offline) since the peer-to-peer network may operate independent of an intermediary control system (e.g., PLC) guiding individual transactions or communications.

Keeping this in mind, systems and methods that improve management of the peer-to-peer communication network may include methods that enable discovery of data endpoints (e.g., recipient device) in response to a device being installed into the peer-to-peer communication network. Either a receiving device (e.g., data consuming device, consumer) or a transmitting device may perform a discovery operation on the peer-to-peer communication network. For example, when a receiving device is discovered by a transmitting device (e.g., data producing device, producer), the transmitting device may initialize a sub-network (subnet) between the devices, such that a subnet is a portion of a communication network logically designated for transmitting messages between two or more network devices. The transmitting device may transmit the device configuration file to receiving devices via the established subnet. When a newly installed device into the peer-to-peer communication network is discovered, the respective device that discovered the new device may automatically transmit the backup device configuration file from the respective device to the newly installed device, thereby initializing the newly installed device to the peer-to-peer communication network (e.g., reconfiguring the replacement device). A peer-to-peer communication network that operates to backup device configuration files may enable the peer-to-peer communication network to "self-heal" or automatically reconfigure devices added to the peer-to-peer communication network to replace a previous network device.

Unlike systems that use an intermediary control system, either the receiving device or the transmitting device may start a data transaction in the above-described peer-to-peer network. In this way, an intercommunicating device pair may not wait to receive a control signal from the intermediary control system to start a data transmission. This may improve data communication latencies of the industrial automation system since the transmitting devices may transmit data to receiving devices at will and without latencies associated with an intermediary control system synchronizing communications.

By way of introduction, FIG. 1 is a block diagram of an example peer-to-peer communication network (P-P network) 10 that may be employed in an industrial automation system. The P-P network 10 includes network devices 12 (12A, 12B, 12C, 12D, 12E). Each of the network devices 12 may include sensing circuitry for monitoring an industrial automation system. Sensing circuitry of the network devices 12 may generate output data indicative of an operation and/or aspect of the industrial automation system. For example, a network device 12A may detect when an input button is pressed, such as to start a motor. Some network devices 12 may include sensing circuitry that generates digital or analog values representative of a sensed voltage, current, pressure, moisture level, audio level, containment level, or any other suitable parameter associated with operation of the industrial automation system. Sensing data resulting from the sensing circuitry may be of any suitable format, and thus may include one or more analog electrical signals, digital data signals, pulse-width-modulated data signals, or the like. It is noted that the acquired data may be transmitted via any wired or wireless communication signals, such as radio frequency signals. Network devices 12 may also include a variety of scanners, gauges, valves, flow meters, or the like, and may each generate sensing data. Data generated by the network devices 12 may be used in controlling operations of the industrial automation system, such as by using the data as an input in a control loop. In this way, the P-P network 10 may represent a subset or portion of an industrial control network used to manage operations of the industrial automation system.

Each of the network devices 12 may receive communication signals and/or power supply signals from a communication gateway and power supply device 14 and/or other network devices 12. The network devices 12 may use these supplied signals to perform sensing operations, to transmit output operations, or the like. For example, the network device 12B may detect when a corresponding input button has been pressed as part of a stop request, and the network device 12B may use the supplied signals from the communication gateway and power supply device 14 to detect that the input button has been pressed when a contact closes, completing an electrical coupling between the sensing circuitry and a line supplying an electrical signal from the communication gateway and power supply device 14, thereby generating a detectable voltage or current.

One or more of the network devices 12 may couple to a load. For example, the network device 12E may be a motor starter that couples to a motor and controls an operation of the motor based on control signals output from input/output circuitry 16E. Each of the network devices 12 may be coupled to the P-P network via the respective input/output circuitry 16. Each of the network devices 12 may include other input/output circuitry to couple to non-network components (e.g., loads). Data generated by the network devices 12 may be packaged in a message and transmitted to network devices on the P-P network 10 and/or other devices via the communication gateway and power supply device 14 through the P-P network 10.

The network devices 12 may operate responsive to device configuration files. A device configuration file may define processing instructions, settings, operating ranges, indications of connections to other components within the industrial automation system, or the like, and may be used to customize an operation of devices and/or the control system to a particular process. In this way, operation of the network devices 12 may be define by respectively stored device configuration files. For example, the network device 12A may store a first device configuration file while the network device 12B may store a second device configuration file different from the first device configuration file.

Sometimes during operation, the network devices 12 may lose the stored device configuration file and/or one or more of the network devices 12 may be replaced, resulting in a lack of the device configuration file. In this way, the situation may arise in which a device configuration file may be transmitted to the network device 12 during operation of and/or after a first initialization of the P-P network 10 (e.g., a first power on of the P-P network 10 as may be the case with a device replacement operation). Sometimes, a workstation 18 (e.g., computing device) running a P-P manager software 20 may transmit a device configuration file to one of the network devices 12 to initialize operations of the P-P network 10. For example, the workstation 18 may transmit a device configuration file to the network device 12A to reconfigure or initialize the network device 12A according to the device configuration file. However, this process may be lengthy and complicated since the P-P manager software 20 may incur processing delays while transmitting the device configuration file.

In some cases, however, each network device 12 may store a backup copy of the device configuration files of the P-P network 10. In this way, if any of the network devices 12 lose the corresponding device configuration file, a backup copy of the corresponding device configuration file may be restored to the network device 12 to replace the missing device configuration file. This process may restore an original operation to an otherwise inoperable network device 12. For example, network device 12E may receive a backup configuration file from the network device 12A to restore a lost device configuration file.

Figure 2:
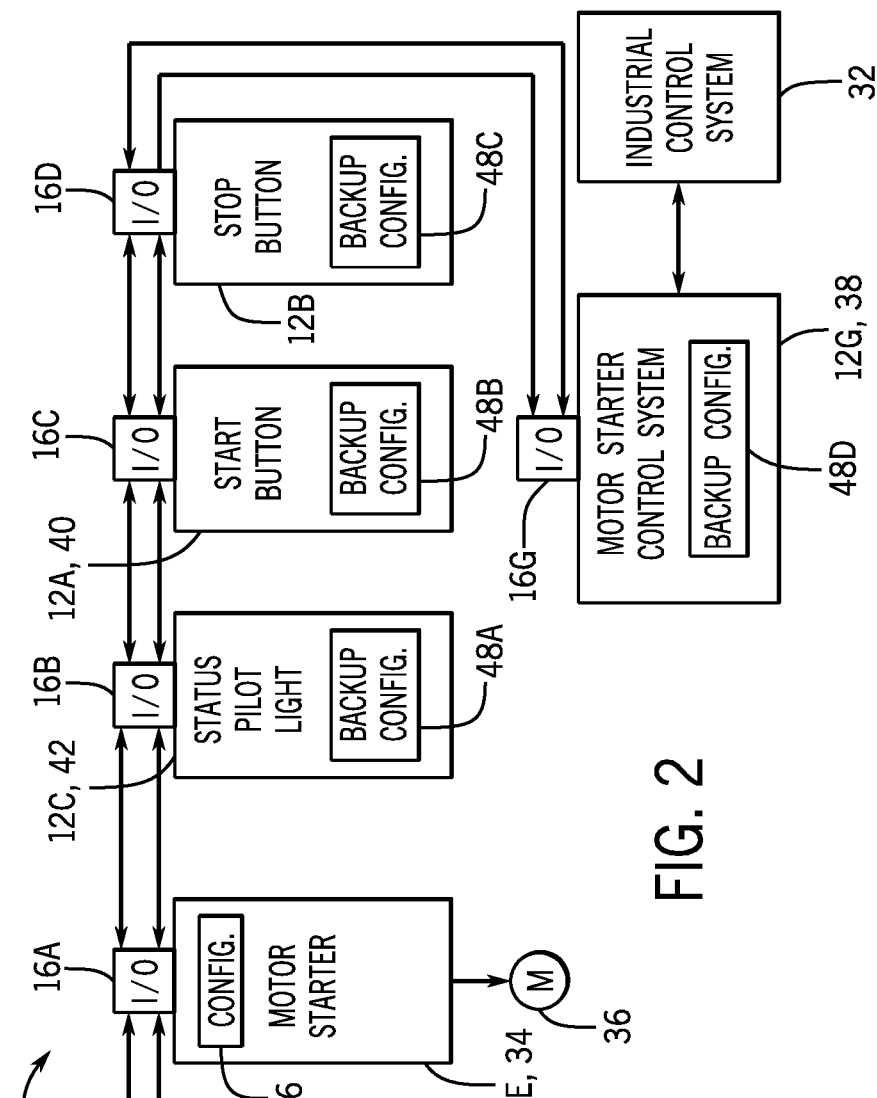
FIG. 2 is a block diagram of an example industrial control system of the industrial automation system of FIG. 1, in accordance with an embodiment.

To provide a particular example, FIG. 2 is a block diagram of an example industrial automation system 30 including at least a portion of the P-P network 10. The P-P network 10 may couple to an industrial control system 32 and/or be a part of the industrial control system 32. In this example, the network devices 12 are communicatively coupled as part of a motor starter system. The network device 12E is a motor starter 34 electrically and communicatively coupled to a motor load 36. The motor starter 34 may control the powering on, powering off, and operational characteristics of the motor load 36 via control signals. The motor starter 34 may generate the control signals based at least in part on control signals and/or messages from the network devices 12A, 12B or the industrial control system 32 via a motor starter control system 38 (e.g., network device 12G that uses input/output circuitry 16G). The motor load 36 is merely one example of a load of the P-P network 10. Clearly, for other applications, the particular system, machine components, machines, stations, and/or conveyors may be different or specially adapted to the application. In addition to the equipment described above, the industrial automation system may also include additional motors, protection devices, switchgear, compressors, and the like.

For example, the motor starter 34 may power on the motor load 36 in response to a message from the network device 12A, a start button 40. The start button 40 may be an input device that enables an operator to provide a control instructions (e.g., start or power on, stop or power off) to the motor starter 34. The network device 12C, a status pilot light 42, may emit light in response to a message from the motor starter 34 indicative of an operation of the motor load 36. Each of the network devices 12 may provide messages to the communication gateway and power supply device 14 and/or to the human/machine interface (HMI) 44. In this way, the HMI 44 may provide visual statuses and/or notifications to an operator of the example industrial automation system 30.

The HMI 44 may operate as an operator interface to permit the operator to provide control instructions to the network devices 12. The industrial control system 32 may represent components of the industrial automation system 30, and operations and/or current statuses of the components, through visualizations of components and/or network devices on the HMI 44. An operator monitoring the industrial automation system 30 may refer to the HMI 44 to determine a current operation of the industrial automation system 30 when adjusting an operation of the industrial automation system 30 and/or for a particular component.

The motor starter 34, as an example, may operate according to a device configuration file 46. Copies of the device configuration file 46 may be stored as a backup device configuration files 48 (48A, 48D) in the network devices 12. In some embodiments, the network devices 12 may each receive a backup device configuration file 48 for each of the other network devices. For example, although network device 12E is not directly adjacent to network device 12A, network device 12A may still receive a backup device configuration file 48B for the network device 12E. In this way, each of the network devices 12 may store a device configuration file 46 and one or more backup device configuration files 48. The backup device configuration files 48 may be used to restore a configuration to the motor starter 34 in the event that something causes the motor starter 34 to lose the device configuration file 46, such as a data loss event or a device replacement. For example, a data loss event may cause the motor starter 34 to lose or remove the device configuration file 46. Additionally or alternatively, a device replacement may involve replacing an original motor starter 34 with a replacement motor starter 34 that does not have the device configuration file 46 stored therein. In either of these cases, one of the backup device configuration files 48 may be used to restore the device configuration file 46 to the motor starter 34.

To restore the device configuration file 46 to the motor starter 34, each network device 12 may detect when the network devices 12E goes offline and/or loses the stored device configuration file 46. For example, when the motor starter 34 goes offline from the P-P network 10, the other network devices 12A, 12B, 12C, 12D may detect this, may determine when the motor starter 34 is powered on again or is otherwise ready to receive the backup device configuration file 48, and may transmit the backup device configuration file 48 to the motor starter 34 to restore the original device configuration file 46 when suitable. In this way, each network device 12 may include a local control system that may detect the statuses (e.g., online or offline status) of the other network devices 12.

The local control system and/or any of the network devices 12 may determine when one of the network devices 12 is online or offline by performing any suitable type of detection operation. Detection operations may include each of the network devices 12 regularly transmitting a signal that is tracked, such that when a threshold number of signals are missed or not detected, a respective of the network devices 12 may be identified as offline or missing. For example, the network device 12E may transmit, at a regular or equal time interval, a signal to the network device 12A. The network device 12A may monitor for the signal and if the time interval were to pass without the network device 12A receiving the signal, a count may be adjusted (e.g., incremented, decremented) to reflect the missed signal. After the count reaches a threshold number, the network device 12A may determine the network device 12E to be offline or missing the device configuration file 46.

Figure 3:
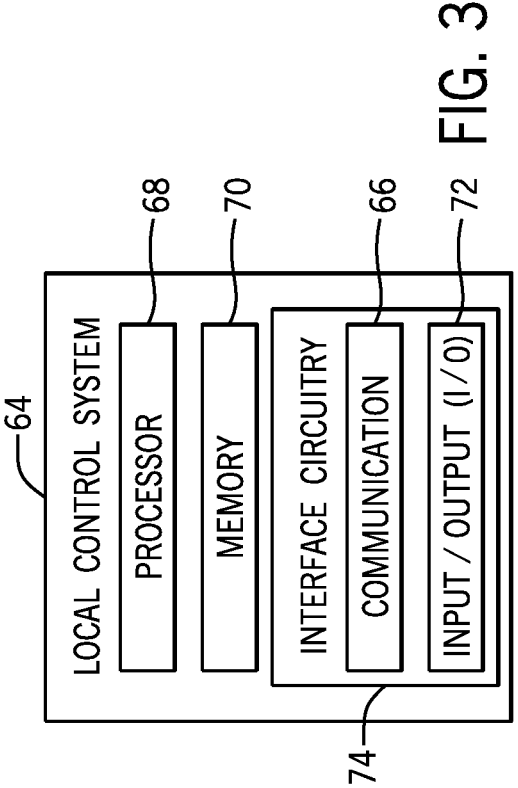
FIG. 3 is a block diagram of an example local control system of the industrial control system of FIG. 2, in accordance with an embodiment.

An example of a local control system is shown in FIG. 3. FIG. 3 is a block diagram of an example local control system 64 used to perform one or more of the operations described herein. Each of the network devices 12 may include a respective local control system 64. By way of example, the local control system 64 may include a communication component 66, a processor 68, a memory 70, input/output (I/O) ports 72, or the like. The communication component 66 may be a wireless or wired communication component that may facilitate communication between the industrial automation components, the industrial control system, and other communication capable devices. Although depicted as coupled to other components of the industrial control system, it should be understood that one or more local control systems 64 may be associated with any component of the industrial control system. The communication component 66 and the I/O ports 72 may be considered interface circuitry 74.

The processor 68 may be any type of computer processor or microprocessor capable of executing computer-executable code. The processor 68 may also include multiple processors that may perform the operations described below. The memory 70 may be any suitable article of manufacture that serves as media to store processor-executable code, data, or the like. These articles of manufacture may represent computer-readable media (e.g., any suitable form of memory or storage) that may store the processor-executable code used by the processor 68 to perform the presently disclosed techniques. Generally, the processor 68 may execute software applications that include programs that enable a user to track and/or monitor operations of the industrial automation components via a local or remote communication link.

The memory 70 may also store the data, analysis of the data, the software applications, and the like. The memory 70 may represent non-transitory computer-readable media (e.g., any suitable form of memory or storage) that may store the processor-executable code used by the processor 68 to perform various techniques described herein. In one embodiment, the memory 70 may include a software application executed by the processor 68 and used to monitor, control, access, or view industrial automation equipment. The memory 70 may be used to store the device configuration file 46 or the backup device configuration file 48.

The I/O ports 72 may be interfaces that may couple to other peripheral components such as input devices, sensors, I/O modules, and the like. I/O ports 72 may enable the local control system 64 to communicate with the industrial automation equipment or other devices in the industrial automation system. In certain embodiments, the local control system 64 includes and/or couples to various other sensors that may provide additional data related to an ambient environment of the network devices 12 and/or the operation of the industrial automation system. For instance, the other sensors may include an accelerometer, a gas (e.g., smoke, carbon monoxide) sensor, or the like.

Figure 4:
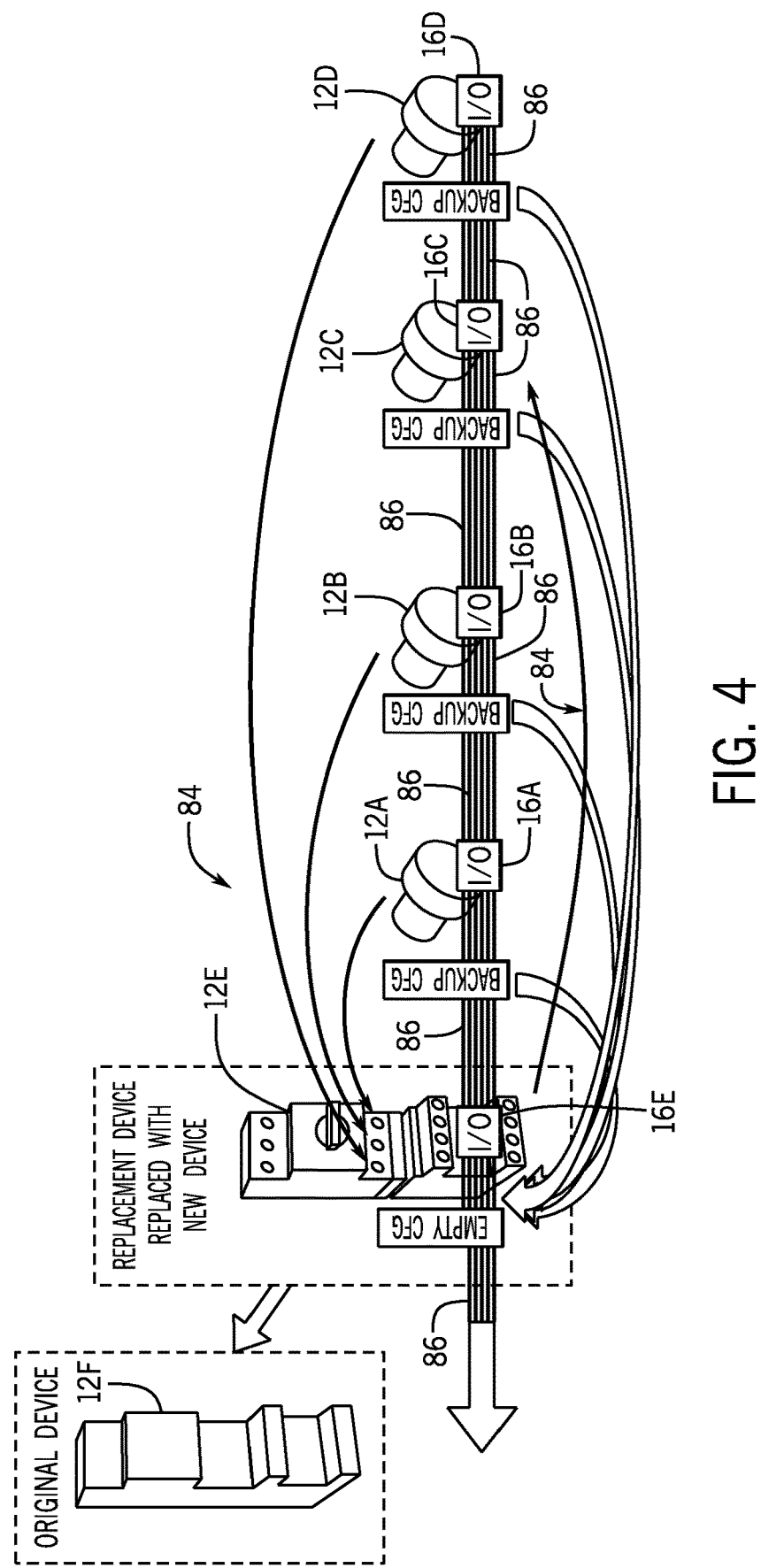
FIG. 4 is a block diagram of a peer-to-peer communication network of the industrial automation system of FIG. 1 after a device replacement, in accordance with an embodiment.

To elaborate on self-healing operations of the P-P network 10, FIG. 4 is a block diagram representation of a state of the P-P network 10 after a device replacement operation. During a normal operation of the P-P network 10, each of the network devices 12 may communicate (via paths 84) with each other. For example, the network device 12A may transmit a message to the network device 12E that indicates a start instruction. As another example, the network device 12E may transmit a message to the network device 12C that indicates a motor load state.

One or more of the network devices 12 may intercommunicate via sub-networks (subnets) of a communication network 86. The communication network 86 may be a smart wire configuration that enables the network devices 12 to couple to the communication network 86 at the input/output circuitry 16. Examples of the smart wire configuration may be shown via FIG. 8, FIG. 9, FIG. 10A, and/or FIG. 10B. Each of the network devices 12 may transmit or receive messages via subnets of the communication network 86. For example, a subnet may guide transmission of data from the network device 12E to the network device 12C and/or from the network device 12A to the network device 12E. Subnets may be logically separated channels of the communication network 86, such that a same network may transmit data via the respective subnets without interruption to simultaneous transmissions. The communication network 86 may be of any suitable network, including wireless networks or wired networks, such as an Ethernet-based network. Each network device 12 may be considered a transmitting device and/or a receiving device. Some of the network devices 12 may operate as both a transmitting and a receiving device. The network devices 12 may transmit messages via respective subnets without assistance, or without being in response to a control signal from, an intermediary control system. To do so, the network device 12 may reference the device configuration file 46 stored in the memory 70 to determine which subnet to use to transmit a generated message. For example, the network device 12E may reference its own device configuration file 46 to determine which subnet and which other of the networked devices 12 to send the generated message. Subnet definitions may be based at least in part on what operation was used to determine the data for the generated message. In this way, different operations of the same network device 12 may use different subnets to transmit data. Adjacent devices may also be bypassed during data transmissions using the subnets since the data may be transmitted through the input/output circuitry 16 without being received at the within the network device 12.

The network device 12 may use one or more identifiers included with the generated message to indicate to routing circuitry and/or to intercommunicating network devices an intended destination of the message (e.g., data endpoint) and through which subnet to transmit the message. Messages transmitted between a first network device 12 and a second network device 12 via a first subnet may not be interrupted by a message transmission between a third network device 12 and a fourth network device 12 via a second subnet since the communications may be separated by logical divisions according to the subnets. For example, a message transmitted via subnet between network device 12A and network device 12E is not interrupted by a message transmitted between network device 12A and network device 12B and/or between network device 12C and network device 12E. Communicating via subnets may improve communication network operation by permitting one or more network devices 12 to intercommunicate without use of an intermediary control system to manage the communications.

The device configuration file 46 may assign a network device to a subnet. In this way, two network devices 12 assigned to the same subnet may intercommunicate via the subnet without communicating via an additional subnet. Each network device 12 may communicate via a variety of subnets that connect one or more network devices 12. For example, the network device 12E may communicate with the network device 12A through a first subset and may communicate with the network device 12B through a second subnet without use of an intermediary control system to manage the data transmissions.

A message generated by a network device 12 may be identified via a header before or after payload data of the message (e.g., sensing data, control operation, status). The header may include data regarding an originating network device 12 of the message, a destination of the message, and a subnet through which to transmit the message. Routing circuitry, such as routing circuitry of the P-P network 10 and/or of the input/output circuitry 16, may interpret the header to determine how to transmit the message through the communication network, and, in particular, the subnet through which to transmit the message. Since subnet definitions may be included in a device configuration file, loading the device configuration file to configure a device of the peer-to-peer communication network may initialize and set (e.g., establish, logically define) communication pathways between the network devices 12.

Sometimes during operation of the industrial automation system 30, a network device 12 is to be replaced. This is represented in FIG. 4 as the network device 12F being replaced by the network device 12E. When the network device 12E replaces the network device 12F, a device configuration file 46 defining the operation of the network device 12F may be stored on to the network device 12E. However, in the P-P network 10 that is able to perform self-healing operations, the network devices 12A, 12B, 12C, 12D may automatically identify when the network device 12F is replaced and may automatically transmit a backup device configuration file 48 to the replacement network device 12E without operator intervention or intermediary control system intervention.

For example, the network devices 12A, 12B, 12C, 12D may determine when one of the other network devices 12F is online or offline by performing detection operations as briefly mentioned above. Detection operations may include each of the network devices 12 broadcasting a signal particularly assigned to the respective network device 12 to be monitored, such that when a threshold number of signals are missed or not detected, a respective of the network devices 12 may be identified as offline or missing. For example, the network device 12A may transmit a signal to the network device 12E at a regular or equal time interval. The network device 12E may monitor for the signal and if the time interval were to pass without the network device 12E receiving the signal, a count may be adjusted (e.g., incremented, decremented) to reflect the missed signal. After the count reaches a threshold number, the network device 12E may determine the network device 12A to be offline or missing. In some cases, a continuous status signal may be transmitted to the P-P network 10 by each of the network devices 12, such that when one of the continuous status signals disappears, each of the other network devices 12 that are still online are able to determine which of the network devices 12 went offline.

To perform the self-healing operation, for example, the network device 12A storing a backup device configuration file 48 may try to transmit the backup device configuration file 48 to the replacement network device 12E. If that transmission is incomplete or unable to happen, a next network device 12, such as the network device 12B, may try to transmit the backup device configuration file 48 to the replacement network device 12E. Attempting to transmit the backup device configuration file 48 may be repeated until a network device 12 having the appropriate backup device configuration file 48 completes the transmission.

It is noted that each network device 12 of the P-P network 10 may perform the self-healing operations. For example, network device 12A may store a device configuration file 46 defining operation of the network device 12A, in addition to one or more other backup device configuration files 48 for other network devices 12 of the network. This may apply to each network device 12 of the P-P network 10.

Each backup device configuration file 48 may include information used by the network device 12 to perform control operations and/or to intercommunicate via the P-P network 10. The backup device configuration file 48 may mirror a device configuration file 46 for a particular origin device (e.g., network device 12 storing the backed up and original device configuration file 46). Since a device configuration file 46 stores information associated with operations of the network device 12, the device configuration file 46, and thus the backup device configuration file 48, may include an origin device configuration identifier, origin device P-P network configuration data, and/or an origin device P-P network configuration data cyclic redundancy check value (CRC value).

The origin device configuration identifier may include a device address, a position identifier, and/or a device product key. The device address may be a logical address used to identify the originating network device 12 for the purposes of message transmission. In this way, the device address may be interpretable by the communication network 86, such as via routers or routing circuitry of the communication network 86. The position identifier may identify a logical position relative to other network devices 12. For example, the position identifier of network device 12A may indicate numerically that the network device 12A is adjacent to network device 12B and network device 12E. The device product key may identify the particular network device 12 from a perspective of manufacturing. For example, the device product key of the network device 12A may indicate a model, make, year manufactured, and/or operational features of the network device 12A and, in some cases, may differentiate the network device 12A from a similarly manufactured network device. The origin device configuration identifier may enable the network devices 12 to identify the origin device corresponding to the device configuration file 46. Furthermore, the origin device configuration identifier may be used to match a new device to stored backup device configuration file 48 via matching of device product keys. The new device may be an unconfigured network device. When the new device is matched to a backup device configuration file 48, one of the network devices 12 may transmit the backup device configuration file 48 to the new device to bring the new device online (e.g., to turn the new device into a network device 12).

The backup device configuration file 48 may also include origin device P-P network configuration data. The origin device P-P network configuration data may define processing instructions, settings, operating ranges, indications of connections to other components within the industrial automation system, or the like, and may be used to customize an operation of the network device 12 to the P-P network 10 and/or to the industrial automation system 30. For example, the origin device P-P network configuration data may define at what frequency a network device 12 is to sample information, communicate statuses with other network devices 12, update an output from the I/O ports 72, such as a control signal to perform an operation or to communication a status, or the like.

The backup device configuration file 48 may also include the CRC value. The CRC value may be generated when an encryption and/or encoding of the backup device configuration file 48 occurs, such as in preparation for transmission via the P-P network 10. The CRC value may be one or more bits, or character strings, included with a device configuration file 46 and/or a backup device configuration file 48. The CRC value may be used to verify whether a data transmission involving the device configuration file 46 and/or the backup device configuration file 48 is secure and/or performed without comprise to the original data of the device configuration file 46 and/or the backup device configuration file 48 (e.g., was transmitted without unintentional or intentional manipulation). Encryption and/or security operations may use the CRC value when verifying whether unauthorized access attempts are performed to the P-P network 10 and/or any of the network devices 12.

In some embodiments, the new device may retrieve the backup device configuration file 48 from the network device 12. For example, the new device may send a request to the network devices 12 in the P-P network 10 with the device configuration identifier of the new device. The first network device 12 that has a matching backup device configuration file 48 that includes an origin device configuration identifier that matches the device configuration identifier may report back to the new device. The new device may receive the backup device configuration file 48 from the network device 12 with the matched origin device configuration identifier. Then, the new device may store the backup device configuration file 48 as the device configuration file 46.

Determining which network device 12 is to transmit the backup device configuration file 48 (e.g., determining a restoring network device 12) may be based on a date and/or time of the data stored, ongoing operations, a physical proximity, a logical proximity, or the like. When using a date and/or time of data stored, the backup device configuration file 48 that corresponds to a most recent update may be used to restore the configuration file to the new device. Furthermore, when ongoing operations are used to select a copy of the backup device configuration file 48, a candidate restoring network device 12 involved in ongoing operations may not be selected to transmit the backup device configuration file 48. For example, if network device 12A is missing a device configuration file 46 but network device 12B is involved in an ongoing operation and is unavailable to transmit the backup device configuration file 48, the network device 12C or the network device 12D may transmit the backup device configuration file 48 to the network device 12. This may reduce delays caused by waiting for a network device 12 to be available to transmit a backup device configuration file 48.

When using physical proximity as a condition upon which to determine the restoring network device 12 (e.g., the network device 12 that is to be used to restore the original device configuration file 46 to the new device based on the backup device configuration file 48), the network devices 12 may determine a physical distance associated with communication channels of the P-P network 10. The physical distance may be determined based on a difference in locations between network devices 12. For example, a distance may be determined between the new network device 12E and a candidate restoring network device 12A (e.g., one of the network devices 12A, 12B, 12C, 12D being considered to become the restoring network device 12). The pair of devices that has the lowest relative physical distance may be selected (e.g., as a way to lower overall communication time or reduce transmission latencies). When using logical proximity, a similar comparison to physical proximity may be performed but via a comparison that uses logical locations and/or a logical proximity between the new device and the candidate restoring network device 12. For example, the network device 12A may determine that the network device 12B has lost the device configuration file 46. The network device 12A may determine which of the network devices 12 is of closer logical proximity to the network device 12B. The network device 12A may determine that the network device 12D is logically closer to the network device 12B than the network device 12A. The determination of logical proximity may include evaluating subnet routings between network devices 12 and/or anticipated memory retrieval latencies to determine a more efficient logical transmission route relative to possible logical transmission routes.

The network devices 12 may use combination of conditions (e.g., physical proximity, a logical proximity, a date and/or time of the data stored, ongoing operations) to identify the restoring network device 12. For example, a backup device configuration file 48 corresponding to the most recently obtained or stored data that is also physically closest to the new network device 12E may be used to restore the configuration to the new device, such as the backup device configuration file 48 stored in the network device 12A. In this way, a combination of tradeoffs may be considered when determining the identifying network device 12.

Each of the network devices 12 may be a static transmitting device, a static receiving device, a dynamic transmitting device, a dynamic receiving device, or any combination thereof. A static transmitting device may generate a message that includes a option selected from a fixed set of options (e.g., on or off, high or low, yes or no), while a static receiving device may interpret a message to generate an output from a fixed set of options. Each static device may have a fixed set of data options, where the data may be binary data and/or analog data. A dynamic transmitting device may generate a message that includes data from a variable set of options (e.g., a value that changes in response to an input not part of a defined set of options), while a dynamic receiving device may receive one or more messages and use data of the messages to generate an output. Each dynamic device may have a dynamically generated variable set of data options according to a specific operation. The data associated with the dynamic device may be binary or analog.

For example, network device 12A may be a static transmitting device since the network device 12A may generate a message indicating when the start button 40 is pressed but may not generate a message indicating intermediating positions of the start button 40 or indicating at what relative location the button is pressed. On the other hand, a network device 12 that includes a pressure sensor may generate a message that includes data corresponding to a non-binary set of options since the pressure sensor may transmit a message based on a relative indication of pressure within a vessel, and not necessarily in response to pressure being present in the vessel in general.

A communicative coupling between one or more static transmitting devices and one or more static receiving devices may be made via a hardcoded local control and/or via a programmable logic control, as defined via the device configuration file 46. The hardcoded local control may include use a hardcoded subnet definition defining the transmitting devices and defining the receiving devices (e.g., hardcoded in a device configuration file 46). Hardcoded local control may use physical couplings to define subnetworks and/or transmission pathways. The programmable logic control may include one or more determinations to set a receiving network device 12. For example, in a programmable logic control system, a transmitting network device 12 may determine to which receiving device to transmit based at least in part on the generated message and/or generated data before transmission. Sometimes the device configuration file 46 specifics a coordinated local control system for controlling communications between any device type, such as between dynamic transmitting device and static receiving devices, dynamic transmitting device and dynamic receiving devices, or the like. In a coordinated local control system, network devices 12 may process inputs and/or outputs before transmitting data via the P-P network 10. For example, a first network device 12 may generate an analog data-based status to be transmitted to a second network device 12 for interpretation and use in controlling a motor speed but the transmission may include a third network device 12 that changes a color of a light proportional to the value of the analog data-based status from the first network device 12 before transmission onto the second network device 12. As an additional example, the network device 12D may generate a message that a second network device 12E uses to determine a third of the network devices 12 to transmit the message.

Figure 5:
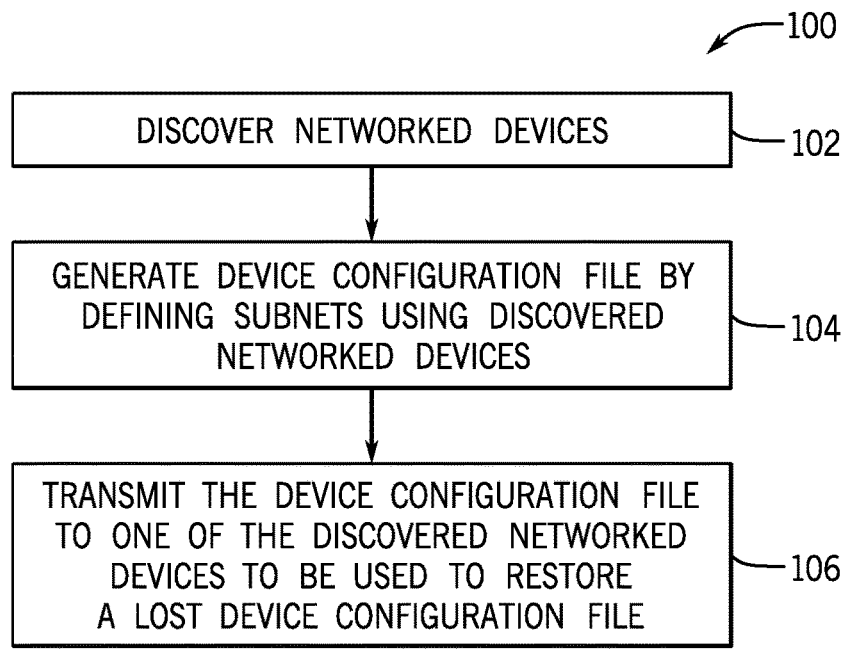
FIG. 5 is a flowchart of a method for generating a backup configuration file of a device configuration file via the peer-to-peer communication network of FIG. 4, in accordance with an embodiment.

To help describe operations of the P-P network 10, FIG. 5 is a flowchart of a method 100 for transmitting a device configuration file 46 via the P-P network 10. Although the method 100 is described as being performed by a network device 12, it should be understood that the method 100 may be performed by any suitable component of the P-P network 10. For example, any network device 12, the industrial control system 32, or any suitable processing circuitry may perform some or all of the method 100. The method 100 may be performed to initialize a network device 12. As described below, particular network devices 12 are called out in the descriptions of the method 100. It is noted that this is done for ease of discussion, and in an actual implementation, the operations described herein may be interchangeable between the network devices 12.

At block 102, the network device 12F may discover other network devices 12A, 12B, 12C, 12D present on the P-P network 10. One or more of the network devices 12 that operate as part of the P-P network 10 may be considered a P-P data endpoint. The network device 12F may perform a search of the P-P network 10 to detect the P-P data endpoints. The communicative couplings of the P-P network 10 may enable the network device 12F to detect connection statuses of the other network devices 12A, 12B, 12C, 12D (e.g., whether or not the other network devices 12A, 12B, 12C, 12D are coupled and/or communicating via the P-P network 10).

At block 104, the network device 12F may generate a device configuration file 46 at least in part by defining subnets. Based on control operations to be performed by the network device 12F and the discovered network devices 12A, 12B, 12C, 12D, the network device 12F may determine which of the discovered network devices 12A, 12B, 12C, 12D that data generated by the network device 12F is to be transmitted, and thus which groups of network devices 12A, 12B, 12C, 12D are associated with each other or with the network device 12F. In this way, the network device 12F may define a subnet between receiving network devices 12 and transmitting network devices 12 determined to be associated with each other. The device configuration file 46 may be a configuration file initially installed on the network device 12F that the network device 12F updates to include definitions of the subnets (e.g., at a later time than initial installation) and/or updates to one or more settings.

After subnet definitions are included in the device configuration file 46, at block 106, the network device 12F may transmit the device configuration file 46 to one or more other network devices 12A, 12B, 12C, 12D as the backup device configuration file 48. The backup device configuration file 48 may be used to restore an original configuration to the network device 12F in the event that the network device 12F is replaced with a new device (presumably a new device without the original device configuration file 46 stored).

When the network device 12F is replaced, one of the other network devices 12A, 12B, 12C, 12D may detect the replacement and facilitate the transmission of the backup device configuration file 48 to restore a previous operational capacity of the replaced network device 12F to a new network device 12E. This process is described by FIG. 6.

Figure 6:
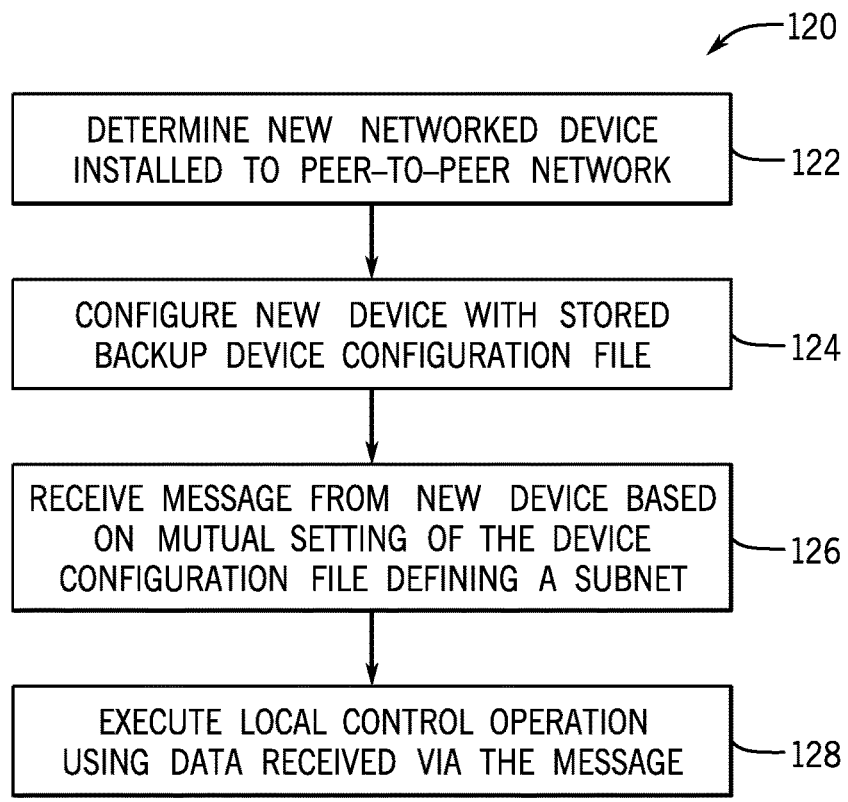
FIG. 6 is a flowchart of a method for performing a replacement of a device configuration file associated with the peer-to-peer communication network of FIG. 4, in accordance with an embodiment.

FIG. 6 is a flowchart of a method 120 for performing a replacement of a device configuration file 46. Although the method 120 is described as being performed by a network device 12, it should be understood that the method 120 may be performed by any suitable component of the P-P network 10. For example, any network device 12, the industrial control system 32, or any suitable processing circuitry may perform some or all of the method 120. The method 120 may be performed in response to the network device 12 detecting a new device being coupled to the P-P network 10. In some cases, the network device 12 may detect a new device being hot-swapped, or physically replaced while the P-P network 10 remains online. As described below, particular network devices 12 are called out in the descriptions of the method 120. It is noted that this is done for ease of discussion, and in an actual implementation, the operations described herein may be interchangeable between the network devices 12.

At block 122, one of the network devices 12A, 12B, 12C, 12D may determine that a new network device 12E is installed into the P-P network 10. A newly installed network device 12E may broadcast a signal via the P-P network 10 for the other network devices 12A, 12B, 12C, 12D to detect and interpret as a notification message from the newly installed network device 12E confirming installation. Additionally or alternatively, one of the network devices 12A, 12B, 12C, 12D may determine that a new network device 12E is installed into the P-P network 10 by polling the P-P network 10 to detect when the network device 12E is installed. Signals used to poll the P-P network 10 may be transmitted by one or more of the network devices 12A, 12B, 12C, 12D on a periodic frequency to regularly check for newly installed devices. Although, the new network device 12E may not be initially able to communicate via the P-P network 10, the new network device 12E may be physically coupled to the P-P network 10. For ease of discussion, network device 12C is described below as detecting the installation of the network device 12E.

In response to determining that the new network device 12E is installed into the P-P network 10, the network device 12C, at block 124, may send the backup device configuration file 48 to the new network device 12E. The backup device configuration file 48 corresponds to a device configuration file 46 of the previously installed network device 12F (e.g., the network device 12 that was replaced). The backup device configuration file 48 may restore settings, operations, and/or thresholds to be referenced by the new network device 12E when performing control operations (e.g., executing local control operations to generate an output from the new network device 12E in response to an input into the new network device 12E). The backup device configuration file 48 may also define a subnet to which certain outputs are to be communicated on by the new network device 12E.

At block 126, the network device 12C may receive a message from the new network device 12E based at least in part on a mutual setting of the backup device configuration file 48 defining a subnet (e.g., now stored as the device configuration file 46 within the new network device 12E). In some cases, the mutual setting may correspond to a type of device to be a data endpoint for data generated by a particular control operation. The network device 12C may be defined as a data endpoint for a control operation of the new network device 12E. Thus, the new network device 12E may transmit data generated via the control operation to the network device 12C, when the data is ready for transmission in a message.

At block 128, the network device 12C may execute a local control operation using the data received via the message from the new network device 12E. In this way, the network device 12C performs an operation based on results from an operation of the new network device 12E. For example, the new network device 12E may output a status indicating a load is powered on and the network device 12C may cause a light-emitting device to emit light in response to receiving data indicating that the load is powered on from the new network device 12C. A variety of suitable control operations may be performed by one or more network devices 12 in response to various inputs and/or outputs from the other network devices 12.

In some embodiments, the P-P network 10 may include an intermediary control system. The intermediary control system may manage communications between network devices 12. However, in these systems, the network device 12 may be able to perform autonomously without instruction from the intermediary control system at least in part by using the systems and methods described herein. For example, if the intermediary control system were to be taken offline, the P-P network 10 may be resilient and may continue to operate using subnet communications between the network devices 12 and/or may continue to operate in response to messages generated via a transmitting network device 12. In this way, the control mode (e.g., intermediary control system operational mode versus local control operational mode via the network devices 12) may be either selected by an operator (e.g., a mode manual selection) or may be automatically selected by the P-P network 10 (e.g., mode automatic selection) in response to the network devices 12 detecting an offline or unusable intermediary control system. In either case, the intermediary control system operational mode or the local control operational mode may be selected via a control signal configurable to switch a switching device, thereby causing the P-P network 10 to enter the operational mode. Additionally or alternatively, the operational mode of the P-P network 10 may be set via an internal parameter controlled by software of the industrial control system 32. When the switching between the operational modes is automatic, a switching condition may be a network status. For example, the P-P network 10 may be switched into the mode automatic selection in response to a status of a communicative coupling between one or more network devices 12 and the intermediary control system.

Figure 7:
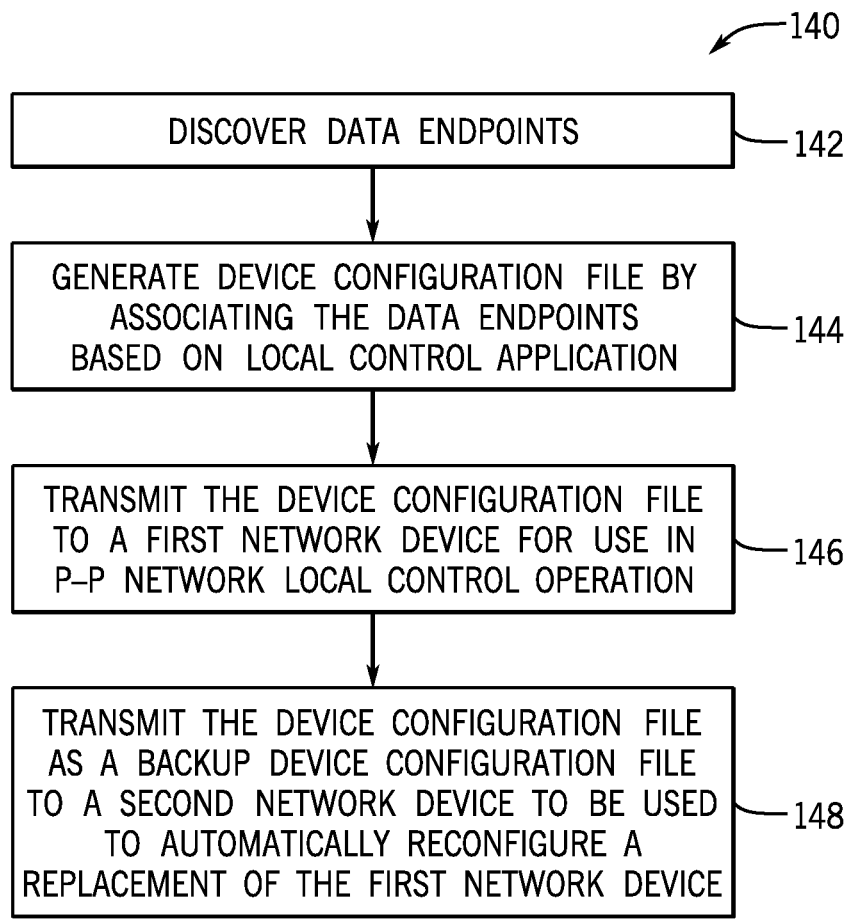
FIG. 7 is a flowchart of a method for generating a device configuration file and a backup device configuration file using a local control system, in accordance with an embodiment.

FIG. 7 is a flowchart of a method 140 for generating a device configuration file 46 and a backup device configuration file 48 using an intermediary control system. Although the method 140 is described as being performed by an intermediary control system, it should be understood that some or all the method 140 may be performed by any suitable component of the P-P network 10, including a network device 12 facilitating the generation of a device configuration file 46 or a backup device configuration file 48. The method 140 may be performed in response to one of the network devices 12, industrial control system 32, the intermediary control system, or any suitable processing device, detecting a new device being coupled to the P-P network 10. In some cases, the intermediary control system may detect a new device being hot-swapped, or physically replaced while the P-P network 10 remains online. As described below, particular network devices 12 are called out in the descriptions of the method 140. It is noted that this is done for ease of discussion, and in an actual implementation, the operations described herein may be interchangeable between the network devices 12.

At block 142, the intermediary control system may discover data endpoints. When performing discovery operations, the intermediary control system may use test control signals to track which network devices 12 are coupled to the P-P network 10. As part of the discovery operations, the intermediary control system may determine which network devices 12 are adjacent to each other and may use that information when pairing a transmitting network device 12 with a receiving network device 12.

At block 144, the intermediary control system may generate a device configuration file 46 by associating the data endpoints based on a local control application. The intermediary control system may store or may retrieve the local control application from memory 70. The local control application may include control and/or operational definitions for each of the network devices 12. The control and/or operational definitions may include definitions for operating frequencies, transmission protocols, conversion polices, or the like, to enable communication between two network devices 12 and the P-P network 10. For example, the network device 12A may operate according to operational definitions of a corresponding local control application. The intermediary control system may generate the device configuration file 46 to include starting points (e.g., device origins) and endpoints for each local control application of the network device 12A. If, for example, the network device 12A outputs a control signal to network device 12E in response to data generated by the network device 12A and data received from the network device 12D, the local control application may define a particular frequency at which the network device 12A is to expect to receive data from the network device 12D, a particular frequency at which the network device 12A is to poll its own sensing devices to receive generated sensing data, and a particular frequency at which the network device 12A is to compare data from the network device 12A and its own generated sensing data to determine the control signal output to the network device 12E. In this example, the starting points of the local control application include the network device 12D and the network device 12A, while the data endpoint of the local control application is the network device 12E. In this way, to generate the device configuration file 46, the intermediary control system may, for example, determine a control operation to be performed by the network device 12A based on a local control application.

The intermediary control system may determine from the local control application a type of device to receive data that is going to be generated and transmitted by the network device 12A. The local control application may define the type of device using the device product key (or a subset of the device product key, such as a string corresponding to a model number or part type). Once the type of device is determined, the intermediary control system may determine which of the network devices 12 corresponds to the type of device. In this example, the intermediary control system may determine that the network device 12E matches the type of device. This may be determined by matching the type of device to one or more of the device product keys of the network devices 12. The intermediary control system may update a device configuration file for the network device 12E to reflect a data endpoint pairing between the network device 12E and the network device 12A for a particular data generation operation. The network device 12E and the network device 12A may be defined to intercommunicate via a subnet coupling since the two network devices 12 are associated with a data endpoint pairing. After updating the device configuration file 46, the network device 12E may reference the data endpoint pairing to determine the subnet through which to transmit data generated via the data generation operation.

At block 146, the intermediary control system may transmit the device configuration file 46 to a first network device for use in the local control application. In response to receiving the device configuration file 46, the network device 12 may configure certain settings, thresholds, ranges, subnets, or the like, defined by the device configuration file 46. After configuration, the network device 12 may reference the information of the device configuration file 46 when determining to perform a local control operation and/or while performing the local control operation.

At block 148, the intermediary control system may transmit the device configuration file 46 as a backup device configuration file 48 to a second network device of the network devices 12 for use in automatically reconfiguring a replacement of the network device 12 that receives the device configuration file 46. For example, the intermediary control system may transmit the device configuration file 46 to the network device 12A and the backup device configuration file 48 to the network device 12B. In some cases, the intermediary control system may transmit the backup device configuration file to the network device 12B, 12C, 12D, and 12E in response to generating the device configuration file 46 to the network device 12A. In this way, each of the network devices 12 may store a backup device configuration file 48 for each of the other network devices 12. Transmission of the device configuration file 46 and the backup device configuration file 48 may happen at the same time, at a partially overlapping time, during different time periods, or any combination thereof.

In some embodiments, the original device configuration file is generated by the P-P manager software 20. The P-P manager software 20 may perform the discovery operation of block 102 of the method 100, and update the original device configuration file with the subnet definitions as performed in the operations of block 104. In this way, block 106 of the method 100 may refer to, in these cases, the P-P manager software 20 transmitting the updated original device configuration file to a first network device 12 as the device configuration file 46 and to other network devices 12 as the backup device configuration file 48.

Figure 8:
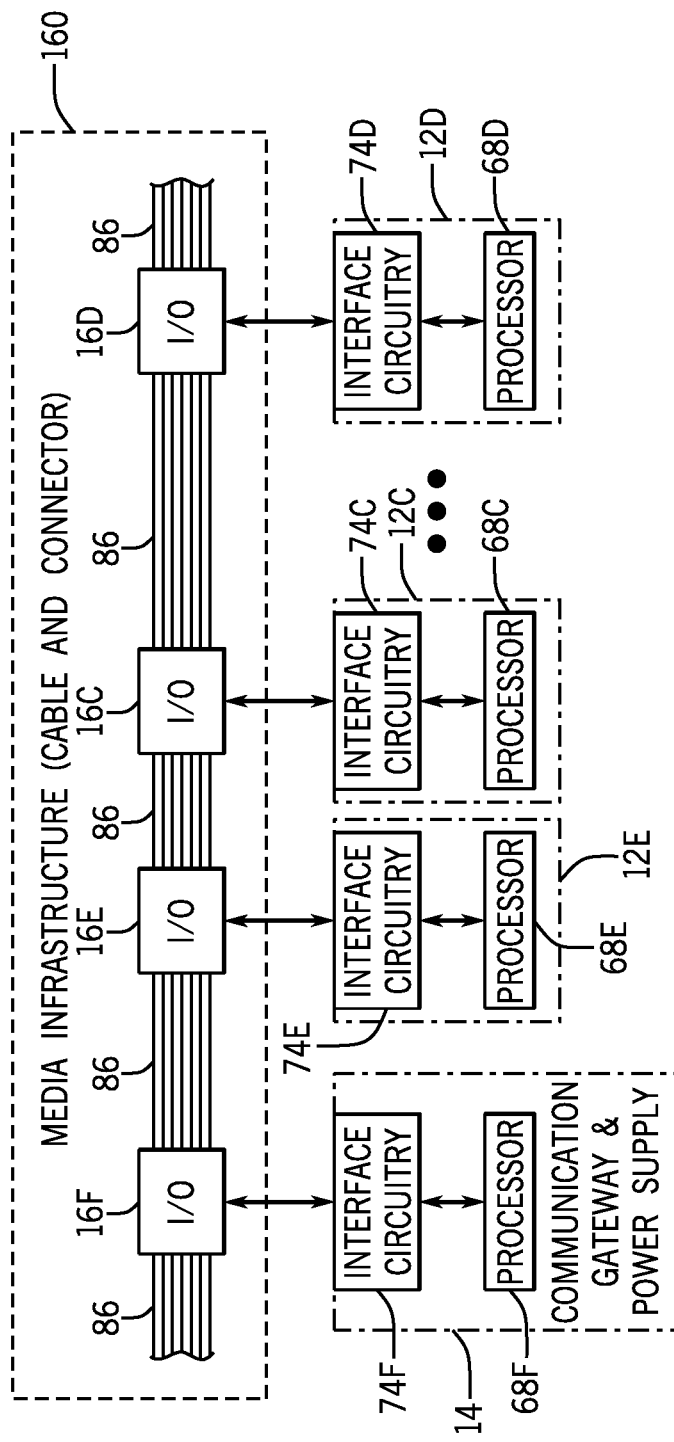
FIG. 8 is a block diagram of the peer-to-peer communication network of FIG. 4 in a smart wire configuration, in accordance with an embodiment.

As described previously, the network devices 12 may communicate via the communication network 86 in a smart wire configuration. FIG. 8 is a block diagram of the communication network in a smart wire configuration that enables each of the network devices 12 to directly communicate with each other without intervention or control by a larger control system. Each network device 12 may generate messages based on operations performed by the processors 68. In response to generating the message, a network device 12 may transmit the message to another of the network devices 12 via a smart wire media infrastructure 160 that includes the input/output circuitry 16 and the communication network 86. In this example, each of the input/output circuitry 16 couples to the smart wire media infrastructure 160 via seven pins and seven couplings, however it is noted that any suitable number of couplings may be used to transmit data between the network devices 16. The interface circuitry 74 may couple to the input/output circuitry 16 using eight pins or eight couplings.

The network devices 12 may transmit messages through the smart wire media infrastructure 160. The messages transmitted may be passed through one or more input/output circuitries 16 before reaching a destination input/output circuitry 16. For example, input/output circuitry 16E may pass a message to the input/output circuitry 16C from the communication gateway and power supply 14 without alteration.

Figure 9:
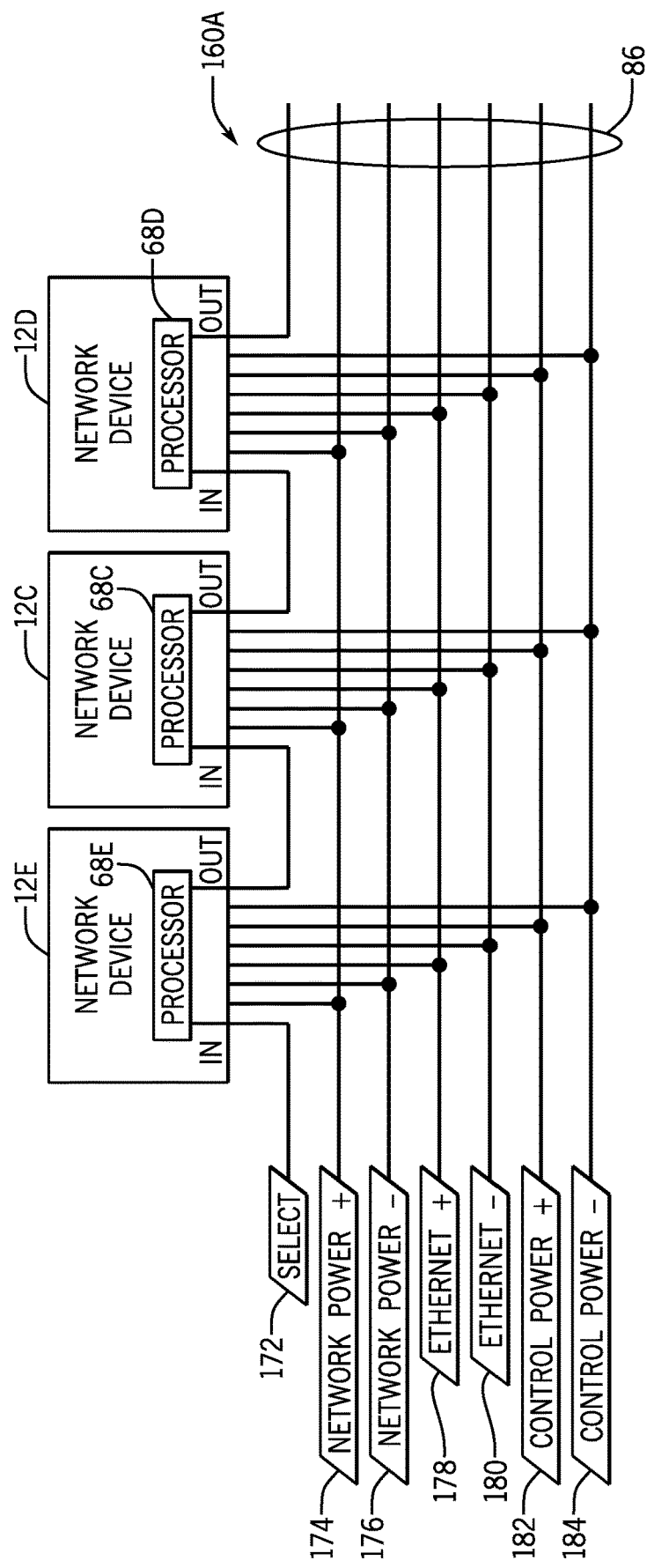
FIG. 9 is a block diagram of logical couplings of the peer-to-peer communication network of FIG. 4 in the smart wire configuration of FIG. 8, in accordance with an embodiment.

FIG. 9 is a block diagram of example logical couplings of the smart wire media infrastructure 160A. Each network device 12 may couple to the other network devices 12 via the communication network 86. Control signals that enable communication between the network devices 12 include a select signal 172, a network power positive signal 174 and negative signal 176, an Ethernet positive signal 178 and negative signal 180, and a control power positive signal 182 and negative signal 184. The select signal 172 may be a sequential service delivery signal that enables the network devices 12 to transmit messages sequentially through the other network devices 12. The network power positive signal 174 and negative signal 176 may delivery power to each of the network devices 12 and/or to the network components of each network device 12 from a power supply or tapped connection off of another electrical coupling. The Ethernet positive signal 178 and negative signal 180 provide for network communication functionality. The Ethernet positive signal 178 and negative signal 180 may be a part of a bus and/or multi-drop topology, a topology where multiple data endpoints couple to a same communication bus. The control power positive signal 182 and negative signal 184 may power an actuator (e.g., a contactor coil) for at least one of the network devices 12. An actuator may execute a control operation for the network device 12. For example, a control operation of the network device 12E may including transmitting a control signal to the motor 36 to power on the motor 36 and an actuator of the network device 12E may close to initiate transmission of the control signal.

Figure 10B:
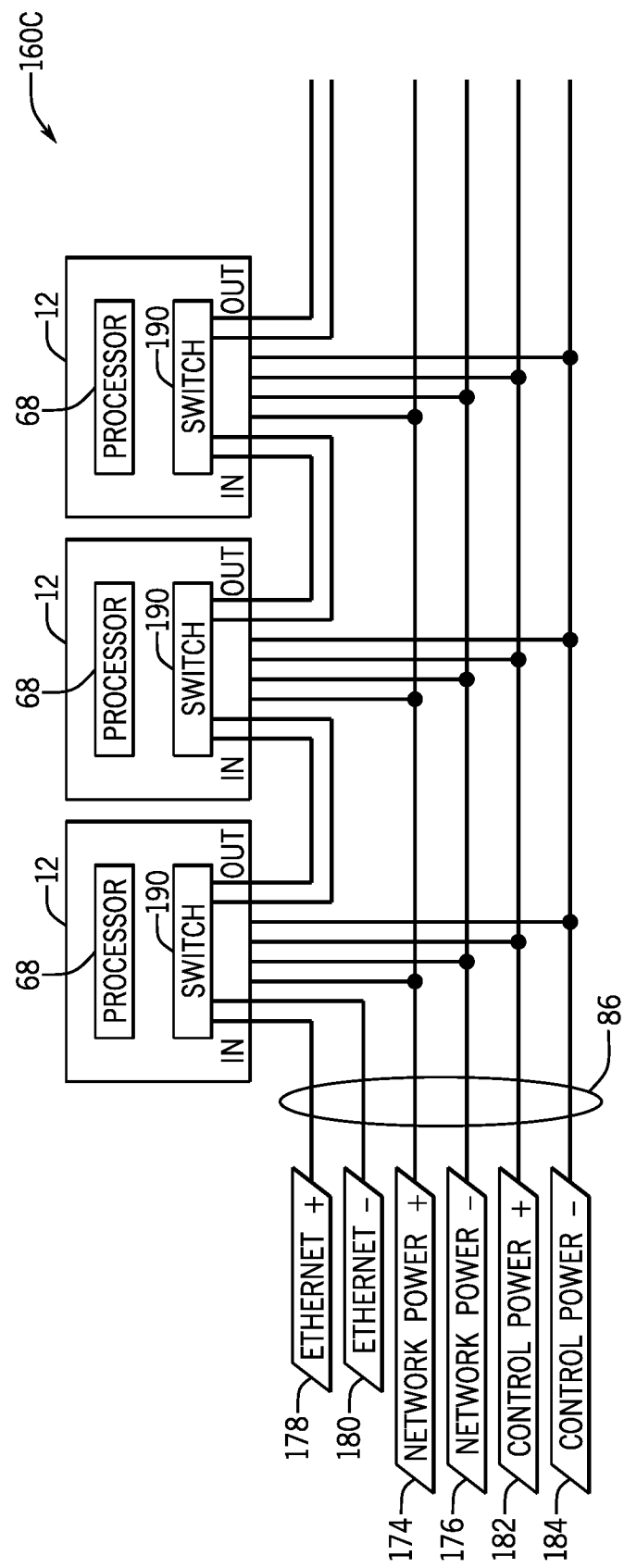
FIG. 10B is a block diagram of logical couplings of the peer-to-peer communication network of FIG. 4 in another example smart wire configuration, in accordance with an embodiment.

Several variations of the smart wire media infrastructure 160A are shown in FIG. 10A and FIG. 10B. While the smart wire media infrastructure 160A may use a seven-line, eight-pin connector to couple the network devices 12 to the communication network 86, FIG. 10A and FIG. 10B show that any suitable number of pins and lines may be used to provide a smart wire communication system.

Keeping this in mind, FIG. 10A is a block diagram of another example logical couplings of a smart wire media infrastructure 160B and FIG. 10B is a block diagram of an example logical couplings of a smart wire media infrastructure 160C. The smart wire media infrastructure 160B may be a five-line cable that uses six-pin connector circuitry to couple the network devices 12 to the communication network 86. The smart wire media infrastructure 160C may be a six-line cable that uses eight-pin connector circuitry to couple the network devices 12 to the communication network 86.

The smart wire media infrastructure 160B combines the network power positive signal 174 and the Ethernet positive signal 178 into a same communicative coupling. The smart wire media infrastructure 160B also combines the network power negative signal 176 and the Ethernet negative signal 180 into a same communicative coupling. In this way, the network power and the Ethernet couplings may share a same pair of wires. The select signal 172 may be of a daisy chain configuration, where each network device 12 is coupled to the adjacent network devices 12.

The smart wire media infrastructure 160C may daisy chain adjacent network devices 12 using the Ethernet positive signal 178 and the Ethernet negative signal 180. The Ethernet signals may transmit through respective switches 190 of the network devices that may control a timing used to transmit messages between network devices 12 via the Ethernet communicative couplings. The network power positive signal 174, network power negative signal 176, control power positive signal 182, and control power negative signal 184 of the smart wire media infrastructure 160C may operate similar to the same signals of the smart wire media infrastructure 160A.

Technical effects of the present disclosure include improving control operations of an industrial control system through use of network devices coupled in a peer-to-peer communication network. The network devices may intercommunicate independently of a control system via the peer-to-peer communication network. In this way, messages transmitted between the network devices may incur relatively less latencies and/or may transmit relatively faster since the network devices are not waiting for control signals from the control system to operate. Furthermore, network devices of the peer-to-peer network may backup device configuration files for the other network devices of the peer-to-peer network. If a network device were to lose a device configuration file, another network device of the peer-to-peer communication network may detect the loss and transmit a stored backup device configuration file to the network device.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
a plurality of network devices communicatively coupled via a network, wherein each of the plurality of network devices comprises a respective plurality of pins configured to interface with one or more network devices of the plurality of network devices; and
a wire infrastructure associated with the network, wherein the wire infrastructure is configured to communicatively couple a first network device of the plurality of network devices to a second network device of the plurality of network devices, wherein the wire infrastructure comprises:
a first coupling configured to provide a control power signal to the first network device via a first pin of a first plurality of pins associated with the first network device and the second network device via a first pin of a second plurality of pins associated with the second network device;
a second coupling configured to receive the control power signal from the first network device via a second pin of the first plurality of pins and the second network device via a second pin of the second plurality of pins;
a third coupling configured to provide a network power signal to the first network device via a third pin of the first plurality of pins and the second network device via a third pin of the second plurality of pins; and
a fourth coupling configured to receive the network power signal from the first network device via a fourth pin of the first plurality of pins and the second network device via a fourth pin of the second plurality of pins.

2. The system of claim 1, wherein the control power signal comprises a positive voltage signal and a second control power signal comprises a negative voltage power signal, and wherein the second coupling is configured to receive the negative voltage power signal as the control power signal from the first network device.

3. The system of claim 1, wherein the first network device comprises six pins of the first plurality of pins configured to couple to the wire infrastructure.

4. The system of claim 3, wherein the first coupling, the second coupling, the third coupling, and the fourth coupling are configured to couple to four pins of the six pins.

5. The system of claim 4, wherein the wire infrastructure comprises a fifth coupling configured to provide a select signal via a fifth pin of the six pins, and wherein the fifth pin is separate from the four pins.

6. The system of claim 5, wherein the select signal is configured to be output via a sixth pin of the six pins, wherein the sixth pin is separate from the fifth pin and the four pins.

7. The system of claim 6, wherein the sixth pin is configured to communicatively couple to a fifth pin of the second plurality of pins associated with the second network device via a sixth coupling between the fifth pin of the second plurality of pins and the sixth pin of the six pins.

8. A system, comprising:
a plurality of network devices communicatively coupled via a network, wherein each of the plurality of network devices comprises a respective plurality of pins configured to interface with one or more network devices of the plurality of network devices; and
a wire infrastructure associated with the network, wherein the wire infrastructure is configured to communicatively couple a first network device of the plurality of network devices to a second network device of the plurality of network devices, wherein the wire infrastructure comprises:
a first coupling configured to provide a control power signal to the first network device via a first pin of a first plurality of pins associated with the first network device and the second network device via a first pin of a second plurality of pins associated with the second network device;
a second coupling configured to receive the control power signal from the first network device via a second pin of the first plurality of pins and the second network device via a second pin of the second plurality of pins;
a third coupling configured to provide a network power signal to the first network device via a third pin of the first plurality of pins and the second network device via a third pin of the second plurality of pins;
a fourth coupling configured to receive the network power signal from the first network device via a fourth pin of the first plurality of pins and the second network device via a fourth pin of the second plurality of pins;
a fifth coupling configured to provide an Ethernet signal to the first network device via a fifth pin of the first plurality of pins; and
a sixth coupling configured to receive the Ethernet signal from the first network device via a sixth pin of the first plurality of pins.

9. The system of claim 8, wherein the first network device comprises a switch device configured to:
receive the Ethernet signal via the fifth coupling and provide the Ethernet signal via the sixth coupling; and
provide the Ethernet signal to the second network device via a seventh coupling and receive the Ethernet signal from the second network device via an eighth coupling.

10. The system of claim 9, wherein the second network device comprises an additional switch device configured to receive the Ethernet signal via the seventh coupling and provide the Ethernet signal via the eighth coupling from the switch device.

11. The system of claim 8, wherein the first network device comprises eight pins.

12. The system of claim 11, wherein the first coupling, the second coupling, the third coupling, the fourth coupling, the fifth coupling, and the sixth coupling are configured to couple to six pins of the eight pins.

13. A wire infrastructure, comprising:
a first coupling configured to provide a control power signal to a first network device via a first pin of a first plurality of pins associated with the first network device and a second network device via a first pin of a second plurality of pins associated with the second network device;
a second coupling configured to receive the control power signal from the first network device via a second pin of the first plurality of pins and the second network device via a second pin of the second plurality of pins;
a third coupling configured to provide a network power signal and an Ethernet signal to the first network device via a third pin of the first plurality of pins and the second network device via a third pin of the second plurality of pins; and
a fourth coupling configured to receive the network power signal and the Ethernet signal from the first network device via a fourth pin of the first plurality of pins and the second network device via a fourth pin of the second plurality of pins.

14. The wire infrastructure of claim 13, wherein the first coupling, the second coupling, the third coupling, and the fourth coupling are configured to couple to four pins of six pins associated with the first network device.

15. The wire infrastructure of claim 14, comprising a fifth coupling configured to provide a select signal to the first network device via a fifth pin of the first plurality of pins.

16. The wire infrastructure of claim 13, wherein the network power signal is configured to power the first network device and the second network device.

17. The wire infrastructure of claim 15, comprising a sixth coupling configured to output the select signal from the first network device via a sixth pin of the first plurality of pins.

18. The wire infrastructure of claim 17, wherein:
the sixth pin of the first plurality of pins is configured to communicatively couple to a fifth pin of the second plurality of pins of the second network device via the sixth coupling, wherein the fifth pin is configured to receive the select signal from the first network device; and
the select signal is configured to enable one or more network devices of a plurality of network devices to transmit information sequentially through the plurality of network devices.

19. The system of claim 9, wherein the seventh coupling is configured to provide the Ethernet signal to the second network device via a seventh pin of the first plurality of pins; and wherein the eighth coupling is configured to receive the Ethernet signal from the second network device via an eighth pin of the first plurality of pins.

20. The system of claim 10, wherein the additional switch device is configured to receive the Ethernet signal via a fifth pin of the second plurality of pins associated with the second network device and provide the Ethernet signal via a sixth pin of the second plurality of pins to the switch device.

* * * * *